Patented Aug. 21, 1934

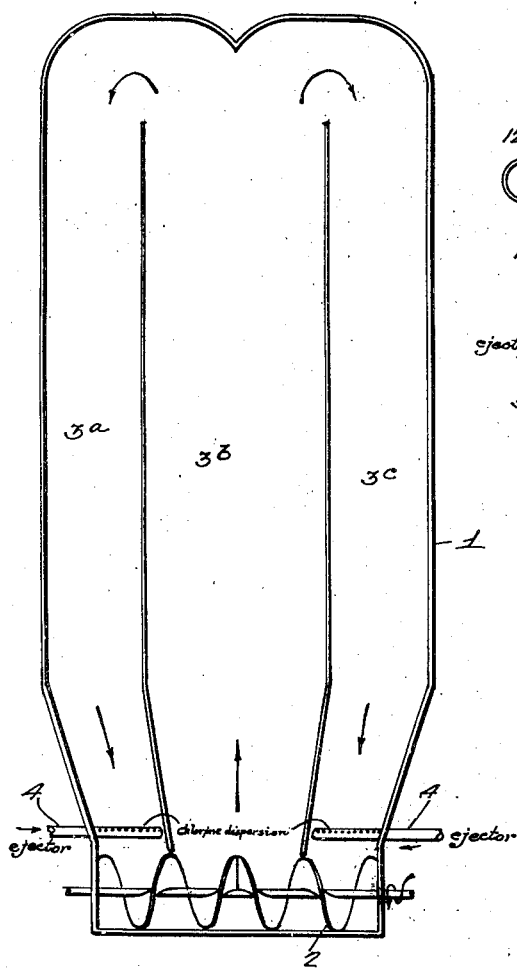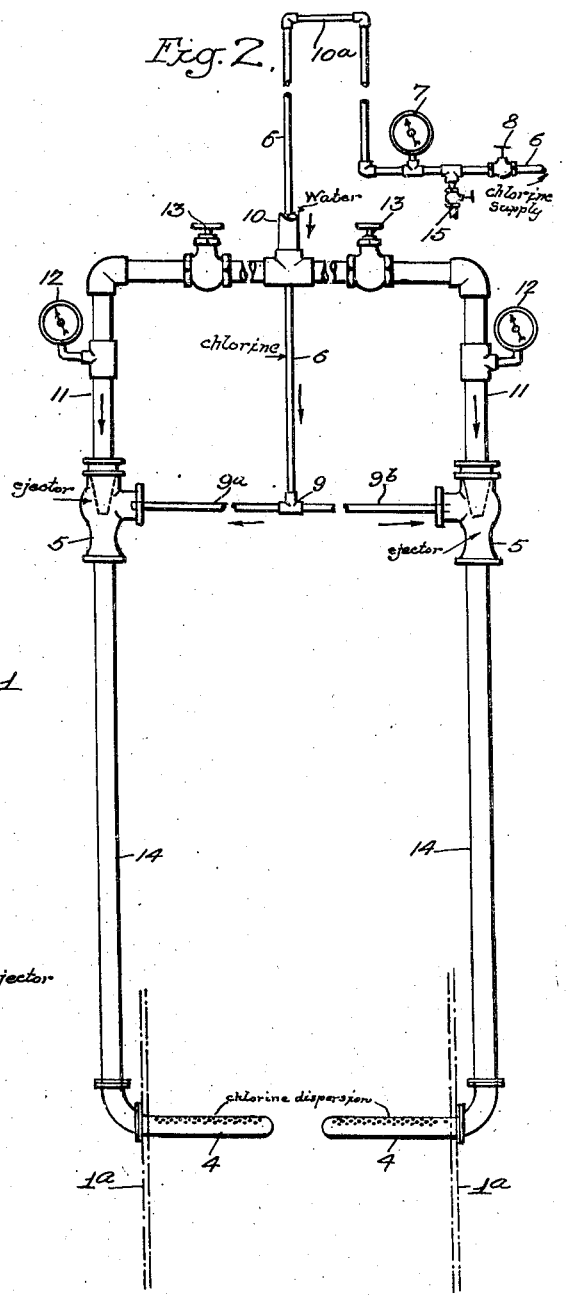

1,971,241

UNITED STATES PATENT OFFICE 1,971,241

METHOD OF CHLORINATION

Charles F. Weitzel and Harry G. Potts, Wyandotte, Mich., and Jude E. Underwood, Swarthmore, Pa., assignors to Pennsylvania Salt Manufacturing Company, Philadelphia, Pa., a corporation of Pennsylvania Application April 1, 1933, Serial No. 664,034

6 Claims. (Cl. 8—2)

The present invention relates to a new and improved method of chlorine treatment, and more particularly it relates to a treatment of materials to be reacted upon by chlorine in which elemental chlorine is brought into intimate contact with the materials in a highly dispersed condition in amounts in excess of the solubility of the chlorine in the dispersing medium.

One object of our invention is to provide a novel method of treating materials with elemental chlorine in which chlorine in a dispersed condition is reacted with the material to be treated, which treatment may be carried out in an open receptacle without gasification, even though the amount of chlorine brought into contact with the materials is greatly in excess of the solubility of the chlorine in the dispersing medium.

A further object of our invention is to furnish a process for chlorine treatment in which the material to be treated, suspended or dissolved in a liquid medium, is presented to elemental chlorine, dispersed and atomized in very finely divided form in a liquid, in such amounts that there will be sufficient material capable of reacting with the chlorine at the point of contact to consume the amount of chlorine admitted, whereby a rapid chlorination is obtained without gasification and with the deleterious side reactions, such as oxidation, reduced to a minimum.

Still another object of our invention is to provide a process for the treatment of materials with elemental chlorine which is easy to operate and is capable of definite and accurate control and in which the apparatus involved is simple in construction and economical to install.

Another object of our invention is to provide a process for the treatment of vegetable fibres suspended in water, particularly suspensions of wood pulp, with elemental chlorine, in which process all types and consistencies of pulp including those of high consistency where the percentage of pulp is greater than 8% and ranges up to 20% may be chlorinated and in which the amount of chlorine added may be easily varied to suit the particular conditions existing in the pulp to insure the use of optimum operating conditions.

Another object of our invention is to furnish a process for chlorinating wood pulp suspended in water in which the deleterious side reactions including the hydrolytic effects with consequent oxidation are reduced to a minimum, thereby giving definite beneficial effects to the paper made from the stock, for example higher color, higher strengths and the like, with a definite saving in chlorine consumption.

Still another object of our invention is to provide a process for the chlorination of wood pulp in which the time required for chlorination is reduced to a minimum so that a maximum utilization of equipment is afforded which in turn minimizes the cost of installation and the changes in plant procedure and in which the plant equipment customarily found in pulp manufacturing plants may be employed, the additional apparatus necessary being economical to install and operate.

Still other objects will be apparent from a consideration of the specification and claims.

Heretofore, in the chlorination of materials with elemental chlorine, the chlorine has either been dissolved in the medium in which the material to be treated is suspended or dissolved, or elemental chlorine has been bubbled into the medium containing the material to be chlorinated. Due to the relative insolubility of the chlorine, the former process has not met with success. The latter process due to the gasification encountered has required either the use of a closed container or the use of a very low rate of chlorine admission. Furthermore, in these processes, the chlorination is relatively slow which allows time for deleterious side reactions to occur, for example when water is used as a medium for carrying the material to be treated hydrolytic reactions take place which allow oxidation to occur. These side reactions are particularly disadvantageous in the treatment of water suspensions of wood pulp due to the fact that the stock is weakened thereby.

It has been determined that the most satisfactory stock is obtained when the first step in the treatment of the stock after the digestion and washing is chlorination in which oxidation is reduced to a minimum. In the chlorination step, the chlorine reacts with the compounds associated with the cellulose, for example those lignin compounds where direct substitution is possible and the ketonic and other bodies where the saturation of the unsaturated compounds may be brought about. This reaction with chlorine renders these products soluble and allows their removal in subsequent washing processes. Previous to the present invention, difficulty has been encountered in preventing oxidation from occurring simultaneously with chlorination. The present invention affords a method whereby the reaction with chlorine is maintained at a maximum and the tendency toward deleterious reactions is reduced to such a point that no material weakening of the fibre is obtained during this step. After the pulp has been treated with elemental chlorine in accordance with the present invention, it is washed to remove the soluble compounds and is thereafter bleached in accordance with well known methods.

The process of the present invention may be employed in the chlorination of all types of materials which are capable of reacting with elemental chlorine, and preferably the material to be reacted is suspended or dissolved in a suitable liquid; for example, water and carbon tetrachloride may be mentioned as typical. In addition to the chlorination of vegetable fibres, for example wood pulp which will be discussed hereinafter specifically and by way of example, the process may be used in the chlorination of ores, rubber, mineral or vegetable oils, and lime or caustic soda, as well as in numerous other instances where like reactions are involved. In any particular instance, the dilution and temperature conditions are chosen to give the desired chlorination and these factors may vary widely depending on the material to be reacted and the rate of chlorine addition.

In the chlorination according to the present invention, the amount of chlorine admitted; that is the rate of chlorine addition, is regulated with respect to the amount of material capable of reaction with the chlorine at the point or points of contact so that the chlorine will immediately react with the material and be absorbed chemically thereby. In order to accomplish the chlorination economically, chlorine is preferably brought into contact with the liquid containing the material to be treated at several points and the liquid containing the material is circulated by the points of chlorine admission, circulation being repeated until complete chlorination is attained. Throughout the chlorination the factors are regulated so that there will be complete reaction with no gasification. If in any case before the mass is entirely reacted gas evolution starts, the rate of chlorine addition is decreased to adjust the conditions for complete reaction. The chlorine addition will be discontinued when the reaction is complete which may be determined by an analysis of the small sample of the material or by the observance of a suitable coloration or a very slight liberation of chlorine gas.

The elemental chlorine is presented to the material to be chlorinated in the form of very fine gas particles separated one from the other by an atomized liquid dispersing medium, the chlorine being dispersed in the medium greatly in excess of the solubility of chlorine in that liquid. The liquid dispersing medium usually corresponds to the liquid in which the material to be chlorinated is suspended or dissolved, but it may be different therefrom. In most instances, it will be desirable to employ either the same liquid in both cases or liquids that are miscible in each other. The dispersion of the chlorine in the liquid may be produced at or near the point of contact with the material to be treated, or the dispersion of chlorine in the liquid medium may be formed at a point somewhat remote therefrom and brought to the point of reaction in this condition and then presented to the material in finely dispersed condition as it is released from the conduit in which it is conveyed. In either case, the chlorine at the time it comes in contact with the liquid containing the material to be chlorinated is in a highly dispersed condition in an amount greatly in excess of the solubility of the chlorine in the dispersing liquid. Due to the rapidity of the chlorinating reaction, practically all of the dispersed chlorine is absorbed chemically by the material to be treated before it has time to dissolve in the liquid in which the material is suspended or dissolved. According to the best theoretical data, one pound of chlorine at 20° C. and at atmospheric pressure requires 16.8 gallons of water to dissolve it for the formation of a saturated solution, but in practice concentrations substantially less than this theoretical value have been employed when elemental chlorine has been added to materials to be chlorinated when it has been desired to avoid the bubbling of the gas and consequent escape thereof. In accordance with the present invention, one pound of elemental chlorine associated in a highly dispersed condition with as small an amount of water as five gallons has been used successfully in open receptacles without gasification. The ratio of water to chlorine may vary widely, one pound of chlorine to eight gallons of water giving excellent results economically.

The requisite diffusion of the elemental chlorine may be brought about in any suitable apparatus which gives the desired fine dispersion of chlorine in the liquid dispersing medium. An apparatus in which one or more nozzles are employed gives excellent results, and of this type of apparatus, the ejector is preferred. Any suitably designed ejector is applicable for use and the suction of the ejector draws the chlorine into the liquid and this together with the turbulence of the flow accomplishes the dispersion of the chlorine. In order to obtain the suction effect, the absolute pressure of the liquid after passing through the nozzle of the ejector must be lower than the absolute pressure of the chlorine before entering the ejector. In general, the gage pressure of the liquid supplied to the ejector varies from fifteen pounds to thirty-five pounds per square inch, preferably being in the neighborhood of twenty pounds to twenty-five pounds per square inch. The chlorine is under sufficient pressure to supply it to the ejector and the particular chlorine pressure employed may vary widely from that obtained by merely cracking the control valve in the chlorine line up to the full pressure attainable from the chlorine source. In any case, the chlorine supply should be under sufficient pressure to give a free flow of the amount of chlorine needed to the ejector. The turbulent flow referred to which aids in bringing about the dispersion is found in all properly designed ejectors and is due to the fact that the high velocity of the water passing through the nozzle is suddenly reduced when it passes into the discharge pipe of much larger cross section. In a typical case, a satisfactory dispersion of one pound of chlorine in eight gallons of water is obtained by using a standard two-inch ejector to which water is supplied at twenty to twenty-five pounds per square inch gage pressure. The chlorine supply pressure need only be sufficient to supply the required weight of chlorine under the particular conditions existing in the supply pipe line. For example, with a pipe line approximately fifteen feet long of standard one-half inch pipe, the needed amount of chlorine is obtained with a supply gage pressure of thirty pounds to thirty-five pounds per square inch. In this case, the chlorine is supplied at the rate of six to eight pounds per minute per ejector. The rate of water flow through the ejector is dependent somewhat on the freedom with which the discharge can escape from the ejector but the above figures have easily been attained in practice. In any particular case, the pressures will be selected with respect to each other, the size of the ejector and the particular conditions involved in the piping systems so that very fine gas particles separated one from the other by the atomized dispersing medium will result. From the description, it will be seen that the apparatus forming the dispersion is simple in construction and economical to install and may be employed expeditiously with equipment already installed without substantial changes therein. The above described system allows definite and accurate control of the amount of chlorine to be employed in the process at any particular stage thereof.

As previously pointed out, the process of the present invention allows the use of elemental chlorine in the chlorination of materials in an open receptacle at atmospheric pressure without gasification, even though the amount of gaseous chlorine employed is greatly in excess of its solubility in the medium in which it is dispersed. Due to the high concentration of chlorine employed at the point of reaction, the reaction proceeds very rapidly, much less time being required in the present process than when chlorine dissolved in water is used. The shortening of the time reduces the deleterious side reactions to a minimum, for example when water is employed as a medium in which the material to be chlorinated is dissolved or suspended, the hydrolytic reaction and consequent oxidation is rendered negligible. The avoidance of the side reactions also renders the process more efficient, smaller amounts of chlorine being required to bring about complete chlorination.

Reference is made throughout this description to suspensions of materials in a liquid medium, such as suspensions of wood pulp in water. These terms are not used in a strictly technical sense, and include not only true suspensions but also all mixtures of the liquid and the material to be treated that can be successfully chlorinated with the process described herein. For example, the term "water suspensions of wood pulp" technically generally includes suspensions whose pulp content is not more than 8% on the dry basis but the phrase is used herein to include not only these mixtures of pulp and water but also those mixtures up to a consistency as high as 20% or 21%.

Although we have chosen for the purpose of the specific example to illustrate the invention herein in connection with the chlorination of wood pulp, it is to be understood that it is in no way limited to such a process and is capable of practice in connection with the chlorination of any material which is dissolved or suspended in a liquid medium which under the conditions of reaction will not interfere with the chlorination of the materials being treated.

The chlorination process of the present invention is applicable for the treatment of all types of wood pulp, particularly the chemically digested wood pulps, including the sulphite, sulphate (kraft), soda and "sodite" (neutral sodium sulphite) pulps. The pulps employed herein may be made from any kind of wood capable of being converted into pulp and in fact if the pulps which give an inferior grade of paper, such as those obtained from certain grades of hemlock and balsam are chlorinated by the present process a stock is obtained which when made into paper will have in many instances the strength and other properties of paper made from spruce. Obviously, also, mixtures of various pulps may be chlorinated in accordance with the process herein described.

The chlorination process may be carried out in any suitable apparatus in which the mixture of pulp and water can be continuouly circulated into contact with the fine dispersion of chlorine. The type of apparatus employed, therefore, will be determined in a large measure by the equipment available in the particular mill and by the consistency of the stock. If the consistency of the stock to be treated is relatively low, for example below 8%, the process is advantageously carried out in a receptacle of the so-called chest type where horizontal circulation of the water-pulp suspension is brought about by a screw, a pump, a paddle wheel or the like, the conventional Bellmer engine being typical of this type of apparatus. For water-pulp mixtures of too high a consistency to be circulated horizontally, a high consistency apparatus is employed. This type in general operates on the principle of lifting the mixture by means of a vertical screw and then allowing it to fall from the top of the screw into the annular space around it. By the continuous lifting and falling of the mixture, a vertical circulatory system is provided. The process of the invention is applicable in the chlorination of pulp in this type of system where the consistencies may be as high as 20% or 21%. Since in the process, dilution caused by the admission of water with the dispersion of chlorine occurs, care must be taken not to employ a stock of such a low consistency in the high consistency apparatus that upon dilution slippage will take place. Slippage generally occurs in the high consistency apparatus when a stock of a consistency in the neighborhood of 8% or lower is used. Hence the dilution must not be sufficient to lower the consistency of the stock to this point.

In either type of apparatus, the very finely dispersed chlorine is brought into contact with the circulated water-pulp mixture well below the level of the mixture and preferably near the bottom of the apparatus and adjacent the circulating mechanism the pressure in the chlorinating apparatus being below that of the liquid medium in which the chlorine is dispersed. In the high consistency apparatus, for example, it is admitted at the bottom of the chamber near the screw and adjacent the series of plows which pull the material from the outer portions of the cylinder toward the centrally located screw. As previously pointed out, in the execution of the process, care is taken, regardless of the consistency of the stock, to present sufficient pulp capable of chlorination to the chlorine at the point of contact to absorb chemically the chlorine admitted.

The chlorination process is carried out until it is complete, and in general 40% to 50% of the chlorine needed as indicated by bleachability value of the pulp will be consumed during the treatment with elemental chlorine without gasification as contemplated herein. The bleachability value is defined as the amount of available chlorine in the form of a hypochlorite which is required to give the desired results with a given pulp. The additional amount of chlorine required to give the desired effects is provided in subsequent treatments in which available chlorine from any suitable source is employed, as is more fully set forth hereinafter.

During the chlorination process, acidity in the form of hydrochloric acid is developed, partly as the result of the substitution reactions with the material accompanying the cellulose and partly as the result of the hydrolysis reaction of chlorine and water which in the present process is reduced to a minimum due to the rapidity of the chlorination reaction. In order to render the compounds formed more soluble and more easily washed from the pulp and at the same time to protect the metallic apparatus such as screens and the like, the pulp-water mixture is immediately neutralized after completion of the chlorination has been accomplished. The neutralization may be brought about by the addition of bases such as caustic soda and lime and an excess of these reagents does not deleteriously affect the process or the product under ordinary operating procedures. The mass of pulp and water after neutralization is washed to remove the soluble compounds therefrom. Preferably the washing step follows immediately upon the neutralization step and not, as is the case in prior processes, after a period of retention. In the present process, optimum results are obtained if the neutralization is brought about in as short a time as possible and if the washing immediately follows the neutralization. This procedure reduces the degradation of the stock to a minimum and hence paper made from the stock will have greater strength than paper made from stock processed in accordance with the prior practices. In prior processes, considerable importance is attached to the period of retention during which free chlorine is removed by secondary reactions. It will thus be seen that in the present process, there is not only a saving in time but also a saving in chlorine leading to the production of a stronger stock.

After the soluble compounds have been removed from the pulp-water mixture by the washing step, the pulp is subjected to one or more bleaching processes in which calcium hypochlorite or available chlorine in other suitable form is employed in a manner similar to that ordinarily used. It has been found, however, that when the bleaching process follows the chlorination process of the present invention, only about one-half of the residual theoretical amount of available chlorine is required to give the desired results. As before pointed out, the chlorination process consumes about in general between 40% and 50% of the chlorine indicated by the bleachability value and in the subsequent bleaching or other processes only about one-half of the remaining 50% to 60% of the bleachability value need be taken care of by available chlorine to give the desired results. In other words, the process of the applicants affords large savings in the amount of chlorine required in subsequent steps.

In addition to the advantages previously set forth, the high concentration of chlorine employed in the present process successfully attacks the material accompanying the cellulose which has remained undigested during the cooking process such as in the hard or short cook systems. The rendering of these and the other materials soluble so that they can be removed by washing results in a marked saving in chlorine over that which would be required if oxidation reactions were employed. The elimination of these bodies by chlorination and subsequent washing gives higher physical characteristics to the resultant paper made from the stock than would otherwise be obtained. The Mullin, fold, tear, and color tests, for example, of paper made from stock treated as herein described show higher results than paper made from stock processed according to prior practices. The process also gives a higher freeness test and, therefore, the stock may be given a short time beating thereby gaining economies during this stage of the paper making process.

We have chosen to illustrate and describe the chlorination of wood pulp specifically in a Bellmer engine in operative connection with which ejectors are employed. As before stated, other receptacles containing a water-wood pulp system and other devices capable of dispersing the chlorine may be employed.

In the drawing:

Figure 1 is a plan view of a Bellmer engine provided with inlets for admission of elemental chlorine in a finely dispersed state; and Figure 2 is an elevational view of the supply system employed in accordance with the present invention in conjunction with the Bellmer engine.

The conventional Bellmer engine is shown in Figure 1 with the usual screw 2 for circulating the water suspension of wood pulp through the channels 3a, 3b, 3c in the direction shown by the arrows in the drawing. The Bellmer engine is provided with a system shown in Figure 2 for supplying the elemental chlorine in a dispersed condition. Two perforated pipes 4, one on each side of the Bellmer engine, extend through the walls of the engine near the bottom thereof and preferably adjacent the most narrow point in the side channels 3a and 3c immediately adjacent the screw 2. This location is preferred since the chlorine is admitted at a point well below the liquid level of the pulp suspension and near the point where the channel is the narrowest and hence the velocity of the pulp suspension the greatest. The walls of the Bellmer engine separating channels 3a and 3c from channel 3b are extended, as is customary practice, to a point approaching the screw so that the suspension of pulp will be passed through the screw and not around the end of the wall. In Figure 2, the walls of the Bellmer engine through which the perforated pipes are inserted are indicated by broken lines at 1a. The ejectors are shown at 5 with the interior thereof indicated by broken lines. The chlorine under pressure is fed into the ejectors 5 from a suitable source (not shown) through pipe 6 with a gage 7 therein, the flow and pressure thereof being controlled by valve 8. At 9, the chlorine supply pipe 6 is divided and the chlorine is passed to each of the ejectors 5 through pipes 9a and 9b, the distribution of the chlorine to the two ejectors being controlled by the suction effect of the water passing through the ejectors. The water, under pressure is admitted to the system at 10 and is flowed to the ejectors 5 through pipes 11 with gages 12, the flow being controlled by valves 13. After passing the chlorine and water through the ejectors 5, the intimate mixture is passed through pipes 14 to the Bellmer engine by means of perforated pipes 4. The chlorine inlet pipe 6 is formed as a leg as indicated at 10a in order to eliminate as much as possible the "backup" of moisture into the line and the chlorine supply system. The chlorine line is also provided with a valve 15 to which a supply of dry air is connected. Dry air is admitted to the chlorine line when the chlorine supply is cut off by closing valve 8 in order to sweep out the line and reduce corrosion thereof.

Pulp of any consistency up to the point where it cannot be circulated in the Bellmer engine, for example 8% consistency, may be employed in this type of apparatus in the process of the present invention. The consistency employed will depend somewhat upon the speed at which the Bellmer engine operates and the friction exerted by the Bellmer walls. In general, the faster the circulation of the pulp in the Bellmer, the higher may be the consistency of the pulp in the process herein contemplated. From an economic standpoint, the cost of the power involved in the operation of the Bellmer engine is balanced against the other savings, and consistencies ranging from 5% to 6% are particularly applicable.

In prior processes, consistencies up to 3% to 3½% have been used in the Bellmer type of apparatus. This relatively low consistency has been employed due to the fact that a relatively slow chlorination is obtained and the hydrochloric acid formed, if not diluted by the water accompanying the stock, causes a marked degradation of the stock during the relatively lengthy period of chlorination. A further reason for the use of these relatively low consistencies is found in the fact that a rapid circulation of the stock is thereby possible. With consistencies above 3½% no open system has previously been devised for bringing the elemental chlorine into contact with a pulp-water system without gasification.

With the process of the present invention these relatively low consistencies, as well as consistencies up to 8%, may be used in the Bellmer type of apparatus. The higher consistencies may be used in conjunction with the present method of dispersing the chlorine in the form of very fine gas particles since under these conditions the chlorine, is more easily absorbed and comes in more intimate contact with the pulp over a larger area of moving pulp than has previously been possible, which factors permit a more complete and quicker reaction. The use of the higher consistencies has the further advantage of presenting to the chlorine at the point of contact a greater concentration of pulp and consequently the most economical absorption of chlorine is afforded. The use of the higher consistencies of pulp also represents a further saving since a greater volume of stock may be put through the same apparatus in a unit time.

In a typical case, five tons of air dried hemlock sulphite pulp is made up to a consistency of 5% by the addition of sufficient water, and the pulp-water suspension is placed in a Bellmer engine 1 provided with suitable pipe lines and ejectors (see Fig. 2) for introducing the dispersed chlorine into the suspension. The screw 2 is started and the pulp-water mass is circulated through the channels 3b, 3a and 3c. The speed of circulation in the Bellmer engine is dependent upon the speed at which the screw is revolved and the friction presented to the mass by the lining of the Bellmer engine, as well as its shape and dimensions. In general, in Bellmer engines whose capacity is five tons of air dried stock at 5% to 5½% consistency, the pulp will be circulated in from 3½ to 8 minutes, which means that the whole mass is circulated through channel 3b and divided and passed through channels 3a and 3c and returned to the inlet of channel 3b in this time. In the particular case under consideration, the circulation consumes 3½ to 4 minutes. After the pulp circulation is started the water is admitted to the ejectors 5 by opening valves 13 and when sufficient suction has been created in the ejectors the chlorine is admitted by opening valve 8.

Hemlock sulphite pulp has a bleachability value in the neighborhood of 6%, by which is meant that it will require 6% of its weight (air dry) of hypochlorite, figured as available chlorine, to bring the pulp to the desired bleached condition. This pulp will absorb approximately 42% of its bleachability value in the treatment with the dispersed elemental chlorine, and therefore approximately 250 pounds of chlorine must be brought into contact with the pulp in the process of the present invention. The chlorine may be admitted at any suitable rate and this will be governed by maintaining the water pressure in the supply line and the flow of chlorine to the ejector sufficient to give the desired amount. An average rate of admission of at least 10 pounds of chlorine per minute is particularly applicable and at the start the rate is generally greater than the average rate and decreases until the average rate is reached, for example, the rate may be as high as 20 pounds of chlorine per minute for a period of 2 or 3 minutes. This increase in rate at the start is due to the highly absorptive nature of the pulp when the elemental chlorine is first admitted. The admission of the highly dispersed chlorine is continued until the pulp in the Bellmer engine has absorbed all the chlorine that can be taken up by it, that is in this case 250 pounds, the process therefore being continued for approximately 22 to 25 minutes. The completion of the reaction may be determined by change in color of the solution or by slight odor of chlorine. The temperature of the pulp-water mass is relatively immaterial and may vary from 35° F. to 80° or 90° F., the use of lower temperatures being preferred.

The admission of the dispersed chlorine at the above rate is obtained by passing water through the two 2-inch ejectors 5 with a gage pressure in the supply lines 11 of 20 pounds per square inch. The flow of chlorine is maintained sufficiently high to give the required amount and its absolute pressure at the ejector is higher than the absolute pressure of the water in the ejector. In order to insure a sufficient flow of chlorine the line pressure must be sufficient to overcome the friction losses in the line between the gage and the ejector. In a particular system the chlorine gage pressure (at 7) is maintained at 30 to 35 pounds per square inch. In this installation each of the two ejectors 5 is connected with 9 feet of 1¼-inch extra heavy rubber pipe (9a and 9b) to a T9 equidistant between the ejectors. A pipe 6 of the same size and material, 7 feet 10 inches in height, rises from the T9 and this is connected to a chlorine valve 8 by 20 feet 10 inches of ¾-inch extra heavy iron pipe, which includes the leg 10a, the chlorine gage being within a foot of the chlorine valve. After the chlorination process is completed, the chlorine flow is stopped by a closing valve 8 and valve 15 is then opened by which dry air is admitted to the ejector. This operation is continued until the system has been freed from chlorine, and then the water valves 13 are closed followed by closing of dry air valve 15.

In the above example, wherein at least 10 pounds of chlorine per minute at an average is passed into the Bellmer engine with a water supply gage pressure of 20 pounds per square inch, the water causing the dispersion is passed through the ejectors at the rate of approximately 25 gallons per minute per ejector, resulting in a total addition of water to the Bellmer engine during the chlorination process of approximately 1500 gallons, or 1 pound of chlorine is associated with approximately 5 gallons of water, which is very much in excess of the solubility of the chlorine in water. Aproximately a total of 500 gallons additional water is added at the start prior to the admission of chlorine and at the end in conjunction with the dry air, resulting in a total addition of water to the Bellmer engine of approximately 2000 gallons.

The dimensions of the pipes and the distances of the ejectors from the point of entry into the Bellmer engine and above the level of the pulp may vary as desired. In a particular instance, the chlorine dispersion passes through two 2-inch pipes 14 which are 6 feet 6 inches long, the bend is 8 inches and dispersion tubes 4 are 2 feet 6 inches. The ejectors are 18 inches above the pulp-water level and the depth of the suspension above the perforated pipes 4 is 6 feet at the start. The pressure in the Bellmer engine at the point of entry of the dispersion of chlorine in the water is less than that in the pipe line delivering the dispersion.

After the chlorination is completed a suitable base such as lime is added to the Bellmer engine in sufficient amounts to neutralize practically the acidity and the pulp-water mixture is immediately removed therefrom and the pulp is washed to remove the soluble compounds. Thereafter the pulp is subjected to the usual treatment with a hypochlorite such as calcium hypochlorite to bring about the bleaching thereof. With the 5 tons of pulp treated as hereinbefore described, the bleaching is effected by the use of approximately 175 pounds of available chlorine in suitable form such as calcium hypochlorite, representing a saving of about 30% in chlorine over that employed in the prior practices generally used.

Considerable modification is possible in the apparatus employed in the circulation of the liquid containing the material to be treated in the device used to obtain the dispersion of chlorine and in the physical factors employed, as well as in the material to be treated and in the percentage of elemental chlorine employed both with respect to the liquid dispersing medium and the material to be treated, without departing from the essential features of the present invention.

We claim:

1. The process of chlorination with elemental chlorine which comprises dispersing gaseous elemental chlorine in a liquid medium under pressure in which it is relatively unreactive, in excess of the solubility of the chlorine in the medium; bringing said medium containing the dispersed chlorine under pressure into contact with the material to be chlorinated under less pressure, the chlorine gas being delivered into the material to be chlorinated in the form of very fine gas particles separated one from the other by the atomized liquid dispersing medium; the material capable of chlorination being sufficient in amount at the point of contact with the chlorine to absorb chemically the elemental chlorine admitted.

2. The process of chlorination with elemental chlorine which comprises dispersing gaseous elemental chlorine in a liquid medium under pressure in which it is relatively unreactive, in excess of the solubility of the chlorine in the medium; bringing said medium containing the dispersed chlorine under pressure into contact with the material to be chlorinated under less pressure, the chlorine gas being delivered into the material to be chlorinated in the form of very fine gas particles separated one from the other by the atomized liquid dispersing medium; and circulating the material capable of chlorination sufficiently to present material capable of chlorination at the point of contact with the chlorine to absorb chemically the elemental chlorine admitted.

3. The process of chlorination with elemental chlorine which comprises dispersing gaseous elemental chlorine in a liquid medium under pressure in which it is relatively unreactive, in excess of the solubility of the chlorine in the medium; bringing said medium containing the dispersed chlorine under pressure into contact with a liquid containing the material to be chlorinated under less pressure, the chlorine gas being delivered into the material to be chlorinated in the form of very fine gas particles separated one from the other by the atomized liquid dispersing medium; and circulating said liquid medium containing the material to be chlorinated sufficiently to present material capable of chlorination to the chlorine at the point of contact to absorb chemically the elemental chlorine admitted.

4. The process of chlorination with elemental chlorine which comprises dispersing gaseous elemental chlorine in water under pressure in excess of the solubility of the chlorine in the water; bringing said water containing the dispersed chlorine under pressure into contact with water containing the material to be chlorinated under less pressure, the chlorine gas being delivered into the material to be chlorinated in the form of very fine gas particles separated one from the other by the atomized water; and circulating said water containing the material to be chlorinated sufficiently to present material capable of chlorination to the chlorine at the point of contact to absorb chemically the elemental chlorine admitted.

5. The process of chlorinating wood pulp with elemental chlorine which comprises dispersing gaseous elemental chlorine in water under pressure in excess of the solubility of the chlorine in the water; bringing said water containing the dispersed chlorine under pressure into contact with a water suspension of wood pulp under less pressure, the chlorine gas being delivered into the water suspension of wood pulp in the form of very fine gas particles separated one from the other by the atomized water; and circulating said water suspension of wood pulp sufficiently to present pulp capable of chlorination to the chlorine at the point of contact to absorb chemically the elemental chlorine admitted.

6. The process of chlorinating wood pulp with elemental chlorine which comprises dispersing gaseous elemental chlorine in water under pressure in excess of the solubility of the chlorine in the water, by exerting on the gaseous chlorine in an ejector the suction effect of water under pressure passing through the ejector; bringing said water containing the dispersed chlorine under pressure into contact with a water suspension of wood pulp of a consistency less than 8% under less pressure, the chlorine gas being delivered into the water suspension of wood pulp in the form of very fine gas particles separated one from the other by the atomized water; and horizontally circulating said water suspension of wood pulp sufficiently to present pulp capable of chlorination to the chlorine at the point of contact to absorb chemically the elemental chlorine admitted.

CHARLES F. WEITZEL.
HARRY G. POTTS.
JUDE E. UNDERWOOD.